United States Patent
Bosneag

(10) Patent No.: US 8,437,274 B2
(45) Date of Patent: May 7, 2013

(54) DISCOVERY OF DISCONNECTED COMPONENTS IN A DISTRIBUTED COMMUNICATION NETWORK

(75) Inventor: Anne-Marie Cristina Bosneag, Athlone (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 231 days.

(21) Appl. No.: 12/530,201

(22) PCT Filed: Feb. 28, 2008

(86) PCT No.: PCT/EP2008/052423
§ 371 (c)(1),
(2), (4) Date: Feb. 19, 2010

(87) PCT Pub. No.: WO2008/110462
PCT Pub. Date: Sep. 18, 2008

(65) Prior Publication Data
US 2010/0142404 A1    Jun. 10, 2010

Related U.S. Application Data

(60) Provisional application No. 60/894,041, filed on Mar. 9, 2007.

(51) Int. Cl.
*H04L 12/28* (2006.01)
(52) U.S. Cl.
USPC ............................ 370/254; 709/223; 709/230
(58) Field of Classification Search .................... 370/254
See application file for complete search history.

(56) References Cited

U.S. PATENT DOCUMENTS
7,852,786 B2 * 12/2010 Wang et al. .................. 370/254

OTHER PUBLICATIONS
Leonardo Mariani "Fault-Tolerant Routing for P2P Systems with Unstructured Topology" Jan. 31-Feb. 4, 2005.*
Peter Merz and Katja Gorunova "Fault-tolerant Resource Discovery in Peer-to-peer Grids", Published online: Dec. 22, 2006.*
PCT International Search Report, mailed Jul. 7, 2009, in connection with International Application No. PCT/EP2008/052423.
Mariani, L: "Fault-Tolerant Routing for P2P Systems with Unstructured Topology" Applications and the Internet, 2005. Proceedings. The 2005 Symposium 0 N Trento, Italy 31-04 Jan. 2005, Piscataway, NJ, USA,IEEE, Jan. 31, 2005, pp. 256-263, XP010765767 ISBN: 978-0-7695-2262-3.

(Continued)

*Primary Examiner* — Dang Ton
*Assistant Examiner* — Lionel Preval
(74) *Attorney, Agent, or Firm* — Potomac Patent Group PLLC

(57) ABSTRACT

A system, method, and network node for discovering network nodes and management information distributed in different strongly connected components, SCCs, in a traffic network. When a network node in a first SCC receives a request at an application layer for network management information, the node determines whether it can reach other nodes at the application layer. If not, the node utilizes a functional overlay layer known as the Data Discovery and Distribution, $D^3$, layer to identify and select a set of neighboring nodes to receive the request. The selection procedure provides good probabilistic guarantees that the selected neighbors will include at least one neighbor in a different SCC. The node sends the request to the selected neighboring nodes at the $D^3$ layer.

14 Claims, 3 Drawing Sheets

OTHER PUBLICATIONS

Doyen, G. et al.: "A Hierarchical Architecture for a Distributed Management of P2P Networks and Services" Ambient Networks Lecture Notes in Computer Science; LNCS, Springer, Berlin, DE, vol. 3775, Jan. 1, 2005, pp. 257-268, XP019021912, ISBN: 978-3-540-29388-0.

Graupner, S et al: "Visualizing topology in self-organizing management overlays" Information Visualization, 2003. INFOVIS 2003. IEEE Symposium on Jul. 16-18, 2003, Piscataway, NJ, USA,IEEE, pp. 200-205, XP010648501 ISBN: 978-0-7695-1988-3.

Le, H et al: "An efficient mechanism for mobility support using peer-to-peer overlay networks" Industrial Informatics, 2005. INDIN '05. 2005 3rd IEEE International Conference on Perth, Australia Aug. 10-12, 2005, Piscataway, NJ, USA,IEEE, pp. 325-330, XP010865194 ISBN: 978-0-7803-9094-2.

Narayanan, S.S. and Daley, G, Panasonic E: An Architecture for Peer-to-Peer Session Initiation Protocol (P2P SIP); draft-shim-sipping-p2p-arch-00.txt IETF Standard-Working-Draft, Internet Engineering Task Force, IETF, CH, Feb. 26, 2006, XP015044580 ISSN: 0000-0004.

Merz, P. et al: "Fault-tolerant Resource Discovery in Peer-to-peer Grids" Journal of Grid Computing, Kluwer Academic Publishers, DO, vol. 5, No. 3, Dec. 22, 2006, pp. 319-335, XP019527210 ISSN: 1572-9184.

Cheung, G. et al: "On the complexity of cooperative peer-to-peer repair for wireless broadcasting" IEEE Communications Letters, IEEE Service Center, Piscataway, NJ, US, vol. 10, No. 11, Nov. 1, 2006, pp. 742-744, XP011151544 ISSN: 1089-7798.

Abraham I et al: "Asynchronous resource discovery" Computer Networks, Elsevier Science Publishers B.V., Amsterdam, NL, vol. 50, No. 10, Jul. 14, 2006, pp. 1616-1629, XP025182746 ISSN: 1389-1286 [retrieved on Jul. 14, 2006].

Mosk-Aoyama, D. et al: "Information Dissemination via Network Coding" Information Theory, 2006 IEEE International Symposium on, IEEE, PI, Jul. 1, 2006, pp. 1748-1752, XP031032514 ISBN: 978-1-4244-0505-3.

Bhadra et al. "Complexity of Connected Components in Evolving Graphs and the Computation of Multicast Trees in Dynamic Networks" ADHOC-NOW 2003 (S. Pierre, M. Barbeau & E. Kranakis, eds.), LNCS 2865, pp. 259-270, 2003. Springer-Verlag Berlin, Heidelberg, 2003.

Demers et al. "Epidemic Algorithms for Replicated Database Maintenance" Proceedings of the Sixth Annual ACM Symposium on Principles of Distributed Computing, pp. 1-12, 1987.

* cited by examiner

DISCOVERY OF DISCONNECTED COMPONENTS IN A DISTRIBUTED COMMUNICATION NETWORK

CROSS-REFERENCE TO RELATED APPLICATIONS

This application claims the benefit of U.S. Provisional Application No. 60/894,041, filed Mar. 9, 2007, which is hereby incorporated herein by reference in its entirety.

RELATED APPLICATIONS

This application claims the benefit of U.S. Provisional Application No. 60/894,041 filed Mar. 9, 2007.

TECHNICAL FIELD OF THE INVENTION

This invention relates to network management activities in communication networks. More particularly, and not by way of limitation, the invention is directed to a system and method for discovering disconnected application-level components in large, complex, and dynamic communication networks.

DESCRIPTION OF RELATED ART

The management architecture in use today in communication networks are based on an architecture specified by the ITU-M series of standards. This seminal work in the field of network management had at its center the simple client-server architecture. In the standard text, this is referred to as the "agent-manager" relationship, where the Agent resides on the network equipment being managed and the Manager is a central entity that interacts with the agent for the retrieval of management information and coordination of configuration tasks. This is basically the same paradigm that current third generation (3G) Network Management System (NMS) solutions are based on. This architecture relies on a centralized element or server responsible for collecting data from managed devices, aggregating the data, and setting the state information on the device. The functionality realized in this server is typically divided according to the FCAPS functional taxonomy, as defined by ITU-T in the X.700 specification family.

Communication networks continue to grow in size and complexity, which leads to increased dynamics as individual nodes go on and off line, and links fail and are repaired. These factors introduce a number of challenges to the current centralized NMS architecture. To meet these challenges in part, network management tasks are being distributed down into the network nodes and other network entities themselves in an attempt to increase the availability, performance characteristics, scalability, and correctness guarantees of the network management system.

In the context of distributed network management tasks, at the application level, it is normally necessary that each network node be able to identify a certain number of "neighbors" that it will be in contact with for completing its part of the assigned task(s). This set of neighbors is dependent on the task to be solved. For example, if the task is to verify the consistency of intra-RNC neighbor-cell relations in a WCDMA-based radio network, each Radio Network Controller (RNC) must initiate contact with the other RNC's that its cells have neighboring relations with, and must request the other RNCs to determine whether the cell neighboring relations are defined symmetrically on the neighbor's side.

In general, data existing in the managed network (for example relations between network nodes), usually define a directed graph that can be used at the application level for propagating the processing request from one network element to another until all nodes that should partake in the distributed task are contacted. If this graph is strongly connected (i.e., there is a path between any two nodes in the graph), then requests originating at any network node will eventually be propagated to all other network nodes (presupposing some underlying layer which enables node discovery and addressing).

However, if the graph used for spreading the requests is not strongly connected, there can be no guarantee that requests which originate at one node in the network will be, or can be, propagated to all interested nodes for the current task. This situation is even more likely to occur in the context of dynamic networks, where a faulty or temporarily disconnected node might break the paths in an initially strongly connected graph.

In current centralized NM systems, the central managing node's view of the network is used when processing management tasks. In the context of networks of increased size, complexity, and dynamics, the use of central knowledge for deciding whether a request for distributed processing of a network management task has reached all nodes does not provide high guarantees in terms of scalability, performance, and correctness.

The problems that arise in a centralized solution are: (1) in dynamic situations, the central managing node's view of the network may be outdated; (2) upon each change in the network, the algorithm for discovery of strongly connected components must be run to re-create a current view at the central managing node; (3) when a request for processing a management task is made, the central managing node must keep track of which graph component originated the request, and based on the managing node's view of the overall network, must determine whether there are other components in the graph that cannot be reached directly through the distributed propagation technique.

In Bhadra et al., "Complexity of Connected Components in Evolving Graphs and the Computation of Multicast Trees in Dynamic Networks," 2003, it has been shown that discovery of strongly connected components in evolving networks is NP-complete, which makes the centralized approach impracticable. Such a centralized mechanism will not scale with the number of nodes and the events in the network.

What is needed in the art is an architecture enabling distribution of network management tasks, and a distributed algorithm that can accommodate changes in the application-level graph. The present invention provides a system, method, and network node which achieves these goals.

SUMMARY OF THE INVENTION

The present invention provides high probability that all network nodes requiring communications can be reached, even if the application-level graph of connectivity is not strongly connected. By efficient application of mechanisms such as rumor mongering techniques combined with new processes in the area of distributed network management, a realistic solution is obtained. The invention is based on peer-to-peer communications in a functional overlay layer having good scalability and performance properties. At the same time, the invention provides high probabilistic guarantees of node discovery and data propagation to network nodes disconnected at the application level.

In one embodiment, the present invention is directed to a method of discovering network nodes and management information distributed in different strongly connected components (SCCs) in a traffic network. The method is performed in a first network node in a first SCC, and includes the steps of receiving a request for network management information at an application level, and determining whether the first network node has any neighboring nodes at the application level. If the first network node does not have any neighboring nodes at the application level or is part of a cycle, the first network node utilizes the functional overlay layer to identify and select a set of neighboring nodes to receive the request, wherein at least one of the selected neighboring nodes is in a second SCC. The first network node then sends the request to the selected neighboring nodes at the overlay layer.

In another embodiment, the invention is directed to a system for discovering network nodes and management information distributed in different SCCs in a traffic network. The system includes a functional management overlay layer overlaying the traffic network; and means within each network node for utilizing the functional management overlay layer and semantic information from the traffic network to autonomously locate neighboring nodes in the same or different SCCs in the network and communicate management information directly between each neighboring node and the network node.

In another embodiment, the invention is directed to a network node for discovering neighboring nodes and management information distributed in different SCCs in a traffic network. The network node includes means for utilizing a functional management overlay layer overlaying the traffic network and semantic information from the traffic network to autonomously locate neighboring nodes in the same or different SCCs in the network; and means for communicating management information directly between each neighboring node and the network node utilizing the functional management overlay layer.

In another embodiment, the invention is directed to a method of discovering network nodes and management information distributed in different SCCs in a traffic network. The method includes the steps of receiving a dissemination message in a first network node through a functional overlay layer; determining whether the first network node is in a different SCC from the SCC where the message originated; if the first network node is in a different SCC, initiating a distributed task processing procedure by the first network node at the application level; and if the first network node is not in a different SCC, initiating dissemination of the message to peer neighbors through the functional overlay layer.

BRIEF DESCRIPTION OF THE DRAWINGS

In the following, the essential features of the invention will be described in detail by showing preferred embodiments, with reference to the attached figures in which.

DETAILED DESCRIPTION OF EMBODIMENTS

Figure 1:
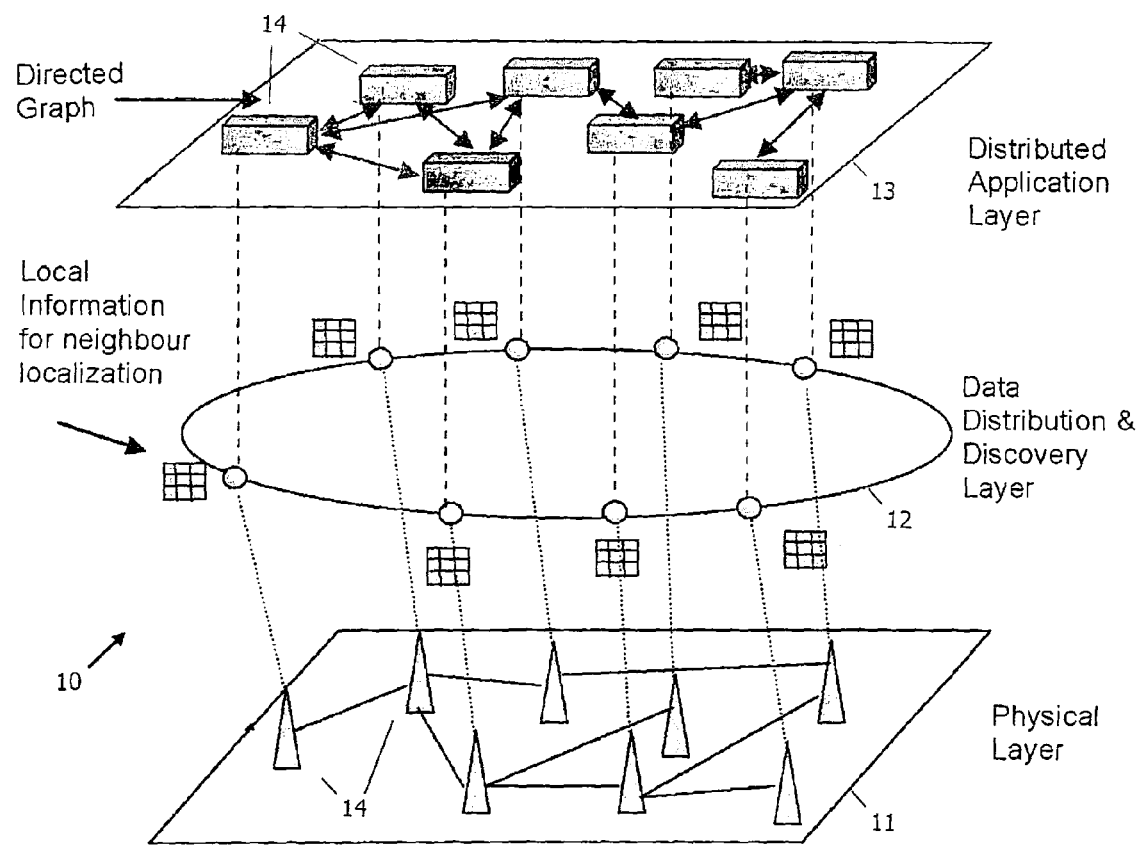
FIG. 1 is a simplified block diagram of a network architecture suitable for implementing the present invention.

The present invention propagates requests beyond neighbors in an application-level relations graph, so that separate components of the graph can be reached. The invention solves the problems arising from graphs which are not strongly connected, by reason of a specific configuration or due to a fault in the graph. The invention solves the problem in a distributed way without relying on a central knowledge repository.

The methodology described herein builds on existing concepts such as peer-to-peer systems and epidemic algorithms. The goals of discovering distributed network nodes and management information, detecting inconsistent management information in the nodes, and distributing network management tasks to the nodes require some form of peer-to-peer architecture, which allows nodes to directly communicate with each other and collaborate together, so as to accomplish specific network management tasks. In peer-to-peer systems, each node has partial knowledge of the network, being therefore able to contact a subset of nodes in the system. The present invention exploits this knowledge for extending requests to parts of the network that are not necessarily covered by the relations graph between network elements.

Epidemic algorithms are described by Demers et al. in "Epidemic Algorithms for Replicated Database Maintenance," Proceedings of the Sixth Annual ACM Symposium on Principles of Distributed Computing, 1997. Epidemic algorithms are used in distributed systems for distributing data through the system. In addition to providing a scalable mechanism for data propagation, epidemic algorithms also provide high guarantees of stable behavior in the face of a high rate of link and node failures. There are several variations of epidemic algorithms, such as anti-entropy and rumor mongering algorithms, each of these being further classified according to the propagation mechanism employed (for example, push vs. pull), or according to the different ways in which nodes select the neighbors to receive the information. However, the basic idea in all these algorithms is that each node chooses a set of nodes to contact for update propagation, usually a random subset of the nodes of which it is aware. Probabilities can also be used to vary the cardinality of the set of nodes to be infected. For example, in rumor-mongering algorithms, when a node receives data that it was already aware of, the interest in the rumor declines and so does the probability of further propagation of the data.

The exemplary embodiment described herein works in the context of a Network Management System (NMS) that includes a Data Discovery and Distribution ($D^3$) layer, which allows nodes to discover each other in a distributed way. The network nodes propagate a request through the application plane using the graph of node relations, and also through the $D^3$ layer utilizing a rumor-mongering scheme to select other random nodes in the $D^3$ layer to which the request is to be propagated. The $D^3$ layer enables distributed node discovery and is used for direct communication between nodes. Each node that has no application-level neighbors or is part of a cycle can randomly choose a subset of neighbors from the $D^3$ layer and propagate the request to this subset with varying probabilities.

FIG. 1 is a simplified block diagram of a network architecture 10 suitable for implementing the present invention. In general, the architecture comprises three distinct layers: a physical layer 11, a Data Discovery and Distribution ($D^3$) layer 12, and a distributed application layer 13. The physical layer 11 provides synchronous and/or asynchronous communication between network nodes 14. The communications may be wired or wireless, and may include any one of a number of technologies including, but not restricted to, ATM, Ethernet, TCP/IP, and the like. The $D^3$ layer 12 supports the application layer 13 and provides an indexing capability with an automatically reconfigurable peer-to-peer node discovery layer. The $D^3$ layer may be referred to herein as the overlay network. The application layer provides the basis on which network management tasks are built. The application layer organizes the network nodes into a directed graph based on application-level relations between the nodes. This graph, in turn, defines how the network nodes may collaborate with each other for network management task completion.

In brief, the application-level graph may be viewed as being used to propagate the request, the $D^3$ layer as being used to locate and address nodes, and the physical layer as being used for the actual data communication.

At the $D^3$ layer 12, routing tables and/or neighborhood sets are created according to a pre-defined algorithm, which enables distributed discovery of network nodes 14 and data associated with the network nodes. When a message needs to be sent from one network node to another, the routing information in the overlay node (i.e., local information at the $D^3$ layer) is utilized to discover a route to the target node. In one exemplary embodiment, the overlay is implemented utilizing Distributed Hash Table (DHT) technology, or a variant thereof. Most DHT implementations will guarantee the discovery of the destination node in an average of $O(\log N)$ steps, where N is number of nodes in the $D^3$ layer, with $O(\log N)$ information in the local routing tables.

Whenever a message is received at the $D^3$ layer, if the destination is the current receiving node, the message is forwarded onto the application level. If not, the routing tables/neighborhood sets are used to determine to which network node the message should be forwarded.

Figure 2:
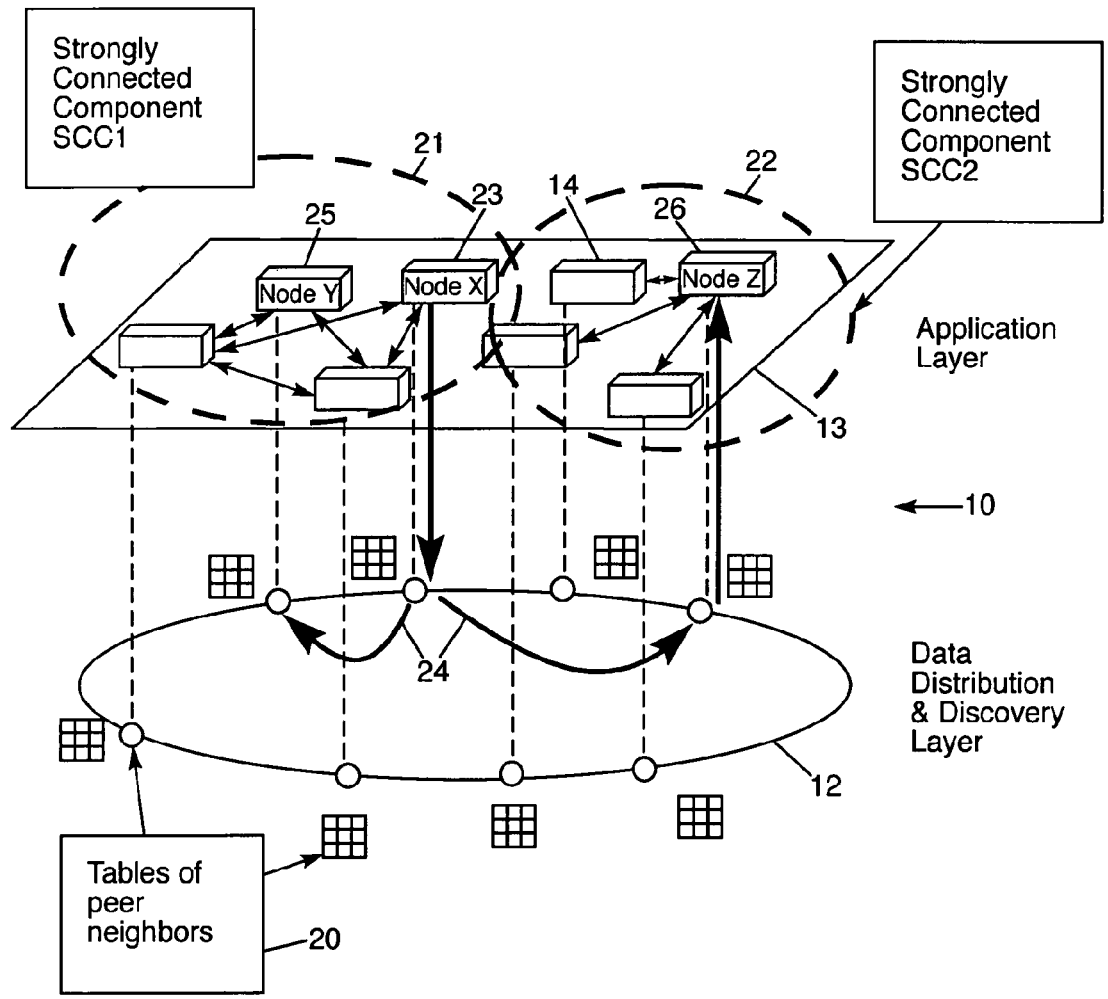
FIG. 2 is a simplified block diagram of the application layer and $D^3$ layer of the network architecture of FIG. 1 illustrating an exemplary scenario for discovering disconnected network components.

FIG. 2 is a simplified block diagram of the application layer 13 and D3 layer 12 of the network architecture 10 of FIG. 1 illustrating an exemplary scenario for discovering disconnected network components in large, complex, and dynamic communication networks. The application layer is represented by a graph of relations between network nodes 14. This graph is dependent on the application; the actual task to be performed defines which network nodes should be contacted by any other network node. An example of such relations is the neighboring cell relations defined for handover purposes between different Radio Network Controllers (RNCs) in a WCDMA Radio Access Network (WRAN).

In the general case, if all relations between network nodes are correctly defined and there are no failures in the system, such an application-level graph is strongly connected (i.e., there is a path from any network node to any other necessary network node in the graph). In this case, it is said that the graph contains one Strongly Connected Component (SCC). However, in the case of widely distributed dynamic systems, situations when the graph becomes non-strongly connected are encountered.

To ensure a request can still reach all network nodes needed to accomplish the task, the present invention utilizes rumor-mongering techniques applied in the $D^3$ layer for further dissemination of the request to network nodes that might be possibly targeted, but are unreachable through the application-level graph.

In the example shown in FIG. 2, the network node relations graph at the application layer comprises two strongly connected components, SCC1 21 and SCC2 22. Requests originating in one SCC cannot be propagated to nodes in the other SCC through the application-level graph. When receiving a processing request, Node X 23 in SCC1 also detects that it is at the "edge" of the graph (either there are no neighbors to which Node X can forward the request at the application level, or Node X is part of a cycle in the graph). Therefore, Node X initiates the process of disseminating the request through the $D^3$ layer 12. At the $D^3$ layer, each node has access to a table of peer neighbors 20, which includes information about how to contact the neighbors. Based on this information, Node X selects one or more neighbors from its table, and sends a message 24 to them. The selection procedure provides good probabilistic guarantees that the selected neighbors will include at least one neighbor in a different SCC. The message includes information about the original request propagated through the application-level graph.

When Node Y 25 receives the message 24, Node Y may detect that it has already processed this request. If so, Node Y utilizes its table of peer neighbors to select other neighbors in the $D^3$ layer and propagates the message to them. When Node Z 26 receives the message, it extracts the information about the original request, and may detect that it never received the processing request. In this case, Node Z sends the request to the application level for appropriate processing.

The number of messages sent through the peer-to-peer $D^3$ layer is limited by two mechanisms:

(1) If a receiving node detects that the message is a duplicate, the receiving node decreases the probability of forwarding the message to peer neighbors by a predetermined amount. The probability must then be above a threshold level for the message to be forwarded. Each receiving node repeats this process until the probability is below the threshold, and the dissemination process stops.

(2) A timeout mechanism is built into the message handling. When the message dissemination begins, the source or originating node initializes a timeout counter. Thereafter, each receiving node decrements the timeout counter and forwards the message only if the timeout counter has not been depleted.

The message in this context, may contain, but is not limited only to, the following information:

(1) Processing request information: information that can be used at the application level should this message reach a node in another SCC;

(2) Probability of forwarding the request;

(3) Timeout: in the form of a counter representing the number of nodes that the message is propagated to before stopping the forwarding process;

(4) Originator of message: when a node initiates the discovery procedure, it must identify itself in the discovery message so that nodes from other SCCs that are interested in this message have a point of reference to which to reply; and (5) Identifier of the application: used for filtering messages and sending the content to the corresponding application. Messages related to several applications may be propagated through the $D^3$ layer, and each of them must be sent to the correct application for processing.

Figure 3:
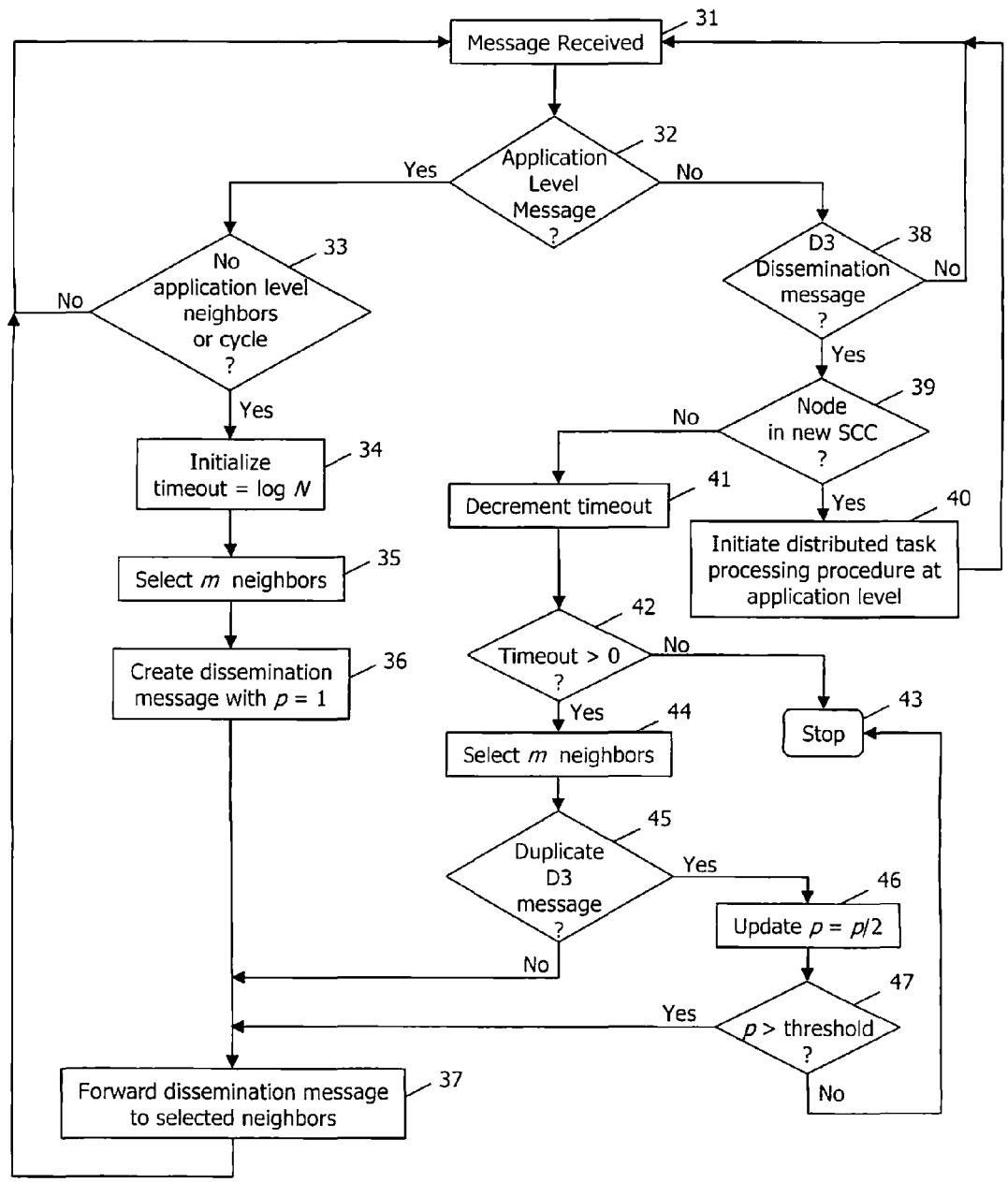
FIG. 3 is a flowchart illustrating the steps of an exemplary embodiment of the method of the present invention.

FIG. 3 is a flowchart illustrating the steps of an exemplary embodiment of the method of the present invention. At step 31, a message is received in a network node from another network node. At step 32, it is determined whether or not the message is a request received through the application layer (i.e., is it an application level message). If the message is a request received through the application layer, the method moves to step 33 where it is determined if the receiving node has no neighbors in the application-level graph to which it can forward the message (i.e., the node is disconnected) or is the receiving node part of a cycle at the application level. If not (i.e., the receiving node has neighbors and is not part of a cycle), the node disseminates the request as part of the management task application through the application layer to neighboring nodes, and the method returns to step 31.

However, if it is determined at step 33 that the receiving node has no neighbors in the application-level graph or is part of a cycle at the application level, the receiving node initiates dissemination of the message at the $D^3$ layer. The method moves to step 34 where the receiving node initializes the timeout counter, which empirical studies have shown works well when equal to log N, where N is the number of nodes in the network. At step 35, the receiving node selects m neighbors from the list of neighbors in the $D^3$ layer to receive the message. The m neighbors are all network nodes that the receiving network node knows how to communicate with (by definition of neighbors in peer-to-peer systems). For example, if the $D^3$ layer is implemented as a DHT, the receiving node can choose log N neighbors from the union of the sets of network nodes included in the routing table, leafset, and neighborhood set. The routing table contains nodes that the receiving node is aware of and uses for routing purposes. The size of the routing table is generally log N. The leafset is a set of L neighbors in the $D^3$ DHT layer, while the neighborhood set is a set of M direct neighbors in the physical layer. All sets include information regarding the location of the neighboring nodes and how to contact them (e.g., IP address).

At step 36, the receiving node creates a dissemination message with the forwarding probability (p) set to 1.0. The dissemination message identifies the original application-level request in order to differentiate between different requests. At step 37, the receiving node forwards the dissemination message through the $D^3$ layer to the m selected neighbors.

If it is determined at step 32 that the message is not an application-level request (i.e., the message is received through the $D^3$ layer), the method moves to step 38 where it is determined whether or not the message is a dissemination message received through the $D^3$ layer. If not, then the message is not recognized as a dissemination message, and no action is taken and the method returns to step 31 and continues to wait for messages. However, if the message is a $D^3$ dissemination message, the method moves to step 39 where it is determined whether or not the receiving node is in a new SCC (i.e., a new graph component has been reached). A new graph component has been reached if the receiving network node has not previously received the request through the application-level graph and is able to process the request. If the receiving node is in a new SCC, the method moves to step 40 where the receiving node initiates a distributed task processing procedure at the application level. The method then returns to step 31.

If the receiving node is not in a new SCC at 39, the receiving node initiates dissemination of the message through the $D^3$ layer. At step 41, the receiving node decrements the timeout counter (timeout:=timeout−1). At step 42, it is determined whether the decremented timeout counter is at an acceptable level (for example, the timeout counter >0). If not, the method stops at step 43. However, if the decremented timeout counter is at an acceptable level, the method moves to step 44 where the receiving node utilizes its table of peer neighbors to select m neighbors. At step 45, the receiving node determines whether the received message is a duplicate message received through the $D^3$ layer. If the message is not a duplicate message, the method moves to step 37 where the receiving node forwards the dissemination message through the $D^3$ layer to the m selected neighbors.

However, if the receiving node determines that the message is a duplicate message at step 45, the method moves to step 46 where the receiving node updates the forwarding probability, p, in the received message. In one embodiment, the receiving node divides the forwarding probability in half (p:=p/2) and then determines at step 47 whether the forwarding probability is greater than a predefined threshold. If not, the method stops at step 43. If the forwarding probability is greater than the predefined threshold, the method moves to step 37 where the receiving node forwards the message to the selected m neighbors with the decreased forwarding probability and timeout values in the message.

By decreasing the forwarding probability as the messages are received, and by decrementing the timeout counter, the present invention limits the number of messages propagated through the network. The propagation stops, for example, either when the timeout counter reaches the value 0, or the probability of forwarding the message is smaller than a predefined limit, (for example, when the probability is less than 1%).

The choice for m, the number of neighbors selected for dissemination, can influence the outcome of the algorithm (measured as success in finding the disconnected graph components). For an implementation of the $D^3$ layer based on DHTs, a value between log N and L provides good guarantees, where N is the number of nodes in the network and L is the size of the leafset. Coupled with a timeout set to log N, a choice for m between log N and L guarantees very good dissemination of the discovery message among the nodes in the network, since DHTs offer a guarantee of average lookup time of O(log N).

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of discovering network nodes and management information distributed in different strongly connected components, SCCs, in a traffic network, said method comprising the steps of: receiving a request for network management information at an application level in a first network node in a first SCC; determining that the first network node does not have any neighboring nodes at the application level or is part of a cycle; utilizing a functional overlay layer to identify and select a set of neighboring nodes to receive the request, wherein at least one of the selected neighboring nodes is in a second SCC; and sending the request to the selected neighboring nodes at the overlay layer; wherein the functional overlay network layer is implemented utilizing a Distributed Hash Table, DHT, and wherein: the step of utilizing the functional overlay layer to identify and select a set of neighboring nodes to receive the request includes selecting between log N and L neighboring nodes, where N is the number of nodes in the network and L is the size of a leafset in the overlay network layer.

2. The method as recited in claim 1, wherein the step of sending the request to the selected neighboring nodes at the overlay layer includes sending the request only if a timeout period received with the request for network management information has not expired and a forwarding probability received with the request for network management information exceeds a predefined threshold value.

3. The method as recited in claim 1, further comprising before the step of utilizing a functional overlay layer to identify and select a set of neighboring nodes to receive the request, the step of determining by the first network node that the request cannot be disseminated to additional network nodes at the application layer.

4. A system for discovering network nodes and management information distributed in different strongly connected components, SCCs, in a traffic network, said system comprising: a functional management overlay layer overlaying the traffic network; and means within each network node for utilizing the functional management overlay layer and semantic information from the traffic network to autonomously locate neighboring nodes in the same or different SCCs in the network and communicate management information between each neighboring node and the network node without utilizing a central management node; wherein the functional management overlay network layer is implemented utilizing a Distributed Hash Table, DHT, and wherein: means within the functional management overlay layer for identifying and selecting a set of neighboring nodes to receive the request includes means for selecting between log N and L neighboring nodes, where N is the number of nodes in the network and L is the size of a leafset in the functional management overlay layer.

5. The system as recited in claim 4,
wherein the means within each network node for utilizing the functional management overlay layer and semantic information from the traffic network to autonomously locate neighboring nodes includes: receiving means for receiving a request for network management information at an application layer in the network node; means at the functional management overlay layer for identifying and selecting a set of neighboring nodes to receive the request, wherein at least one of the selected neighboring nodes is in a different SCC than the network node; and communication means at the overlay layer for sending the request to the selected neighboring nodes.

6. The system as recited in claim 5, wherein the communication means for sending the request to the selected neighboring nodes at the overlay layer sends the request only if a timeout period received with the request for network management information has not expired and a forwarding probability received with the request for network management information exceeds a predefined threshold value.

7. The system as recited in claim 5, wherein the means for identifying and selecting a set of neighboring nodes to receive the request first determines that the request cannot be disseminated to additional network nodes at the application layer.

8. A network node for discovering neighboring nodes and management information distributed in different strongly connected components, SCCs, in a traffic network, said network node comprising: means for utilizing a functional management overlay layer overlaying the traffic network and semantic information from the traffic network to autonomously locate neighboring nodes in the same or different SCCs in the network; and means for communicating management information directly between each neighboring node and the network node utilizing the functional management overlay layer without utilizing a central management node; wherein the functional management overlay network layer is implemented utilizing a Distributed Hash Table, DHT, and wherein: means at the functional management overlay layer for identifying and selecting a set of neighboring nodes to receive the request includes means for selecting between log N and L neighboring nodes, where N is the number of nodes in the network and L is the size of a leafset in the functional management overlay layer.

9. The network node as recited in claim 8,
wherein the means for utilizing the functional management overlay layer and semantic information from the traffic network to autonomously locate neighboring nodes includes: receiving means for receiving a request for network management information at an application layer in the network node; means for determining whether the first network node has any neighboring nodes at the application level; means responsive to a determination that the network node has at least one neighboring node at the application level, for sending the request to the at least one neighboring node at the application level; means responsive to a determination that the first network node does not have any neighboring nodes at the application level, for utilizing the functional overlay layer to identify and select a set of neighboring nodes to receive the request, wherein at least one of the selected neighboring nodes is in a different SCC than the network node; and communication means for sending the request to the selected neighboring nodes at the overlay layer.

10. The network node as recited in claim 9, wherein the communication means for sending the request to the selected neighboring nodes sends the request only if a timeout period received with the request for network management information has not expired and a forwarding probability received with the request for network management information exceeds a predefined threshold value.

11. The network node as recited in claim 9, wherein the means for utilizing the functional overlay layer to identify and select a set of neighboring nodes to receive the request first determines that the request cannot be disseminated to additional network nodes at the application layer.

12. A method of discovering network nodes and management information distributed in different strongly connected components, SCCs, in a traffic network, said method comprising the steps of: receiving a dissemination message in a first network node, said dissemination message being received through a functional overlay layer; determining whether the first network node is in a different SCC from the SCC where the message originated; if the first network node is in a different SCC, initiating a distributed task processing procedure by the first network node at an application level; and if the first network node is not in a different SCC, initiating dissemination of the message to peer neighbors through the functional overlay layer; wherein if the received message is determined to be a duplicate message, the first network node performs the steps of: decreasing a forwarding probability received with the message; determining whether the decreased forwarding probability is greater than a threshold value; and forwarding the message to the selected neighbors only if the decreased forwarding probability is greater than a threshold value.

13. The method as recited in claim 12, wherein the step of determining whether the first network node is in a different SCC includes the steps of: determining that the first network node has not previously received the message at an application level; and determining that the first network node is able to process the message.

14. The method as recited in claim 12, wherein the step of initiating dissemination of the message through the functional overlay layer includes: determining that a timeout counter has not expired; determining that the received message is not a duplicate message; utilizing a table of peer neighbors to select a set of neighbors to receive the message; and forwarding the message to the selected neighbors.

* * * * *